United States Patent
McSherry

(10) Patent No.: US 6,250,865 B1
(45) Date of Patent: Jun. 26, 2001

(54) SCREW TIPPED ANCHOR ASSEMBLY

(75) Inventor: Thomas W. McSherry, Medford, NY (US)

(73) Assignee: Cobra Anchors Co. Ltd, Montreal (CA)

( * ) Notice: Subject to any disclaimer, the term of this patent is extended or adjusted under 35 U.S.C. 154(b) by 0 days.

(21) Appl. No.: 09/463,504

(22) PCT Filed: Jul. 24, 1998

(86) PCT No.: PCT/US98/15550

§ 371 Date: Jan. 24, 2000

§ 102(e) Date: Jan. 24, 2000

(87) PCT Pub. No.: WO99/05419

PCT Pub. Date: Feb. 4, 1999

(51) Int. Cl.[7] .................................................. F16B 21/00
(52) U.S. Cl. ............................. 411/344; 411/340; 411/29
(58) Field of Search .................................... 411/340, 344, 411/345, 346, 29, 30, 31

(56) References Cited

U.S. PATENT DOCUMENTS

| | | |
|---|---|---|
| 3,127,807 | 4/1964 | Modrey . |
| 3,248,994 * | 5/1966 | Mortensen . |
| 3,707,898 * | 1/1973 | Holly . |
| 4,697,969 | 10/1987 | Sparkes . |
| 5,067,864 | 11/1991 | Dewey et al. . |
| 5,221,169 | 6/1993 | McSherry et al. . |
| 5,236,293 | 8/1993 | McSherry et al. . |
| 5,308,203 | 5/1994 | McSherry et al. . |
| 5,322,401 * | 6/1994 | Vernet . |
| 5,529,449 | 6/1996 | McSherry et al. . |
| 5,536,121 | 7/1996 | McSherry . |
| 5,752,792 | 5/1998 | McSherry . |
| 5,833,415 | 11/1998 | McSherry . |
| 5,876,169 * | 3/1999 | Wrigley . |
| 5,944,295 | 8/1999 | McSherry . |

FOREIGN PATENT DOCUMENTS

WO 96/16273    5/1996  (WO) .

* cited by examiner

Primary Examiner—Flemming Saether
(74) Attorney, Agent, or Firm—Nolte, Nolte & Hunter; Christopher B. Garvey

(57) ABSTRACT

A wall anchor assembly has a pair of posts extending from a collar. The collar has an opening for passing a part of a bolt. Distal from the collar, the posts are connected by a connector. An anchor member is captive between the posts and between the collar and the connector. The assembly has a penetrating configuration in which the anchor axis is substantially parallel to the assembly axis, and the anchor body portion and posts form a body portion. A tongue protrudes from an inside surface of a post and engages a groove on the anchor member in the penetrating configuration with the longitudinal anchor axis substantially parallel to the assembly axis, and transmits axial rotation from the collar to the anchor member. The bolt engages a hole in the anchor to draw the anchor member against the wall to clamp the anchor assembly to the wall.

19 Claims, 3 Drawing Sheets

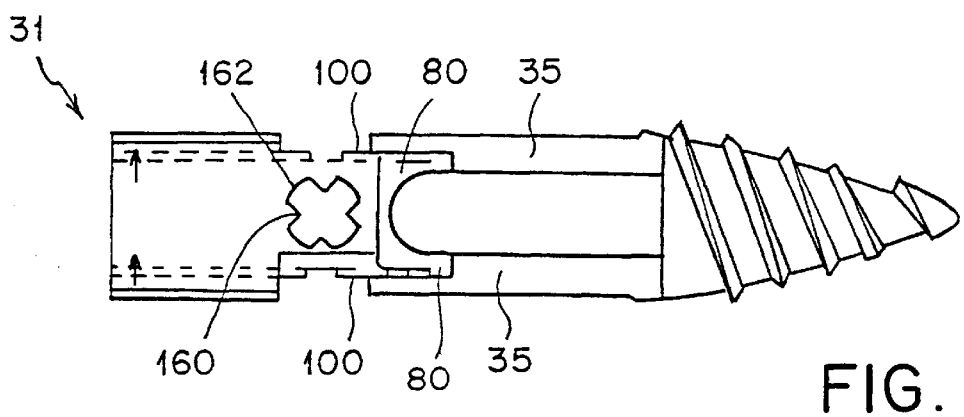
FIG. 6
FIG. 5
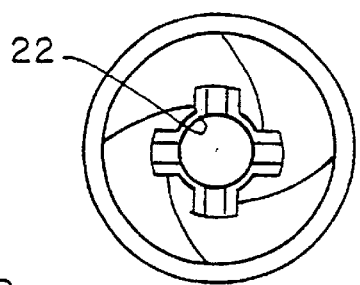
FIG. 7
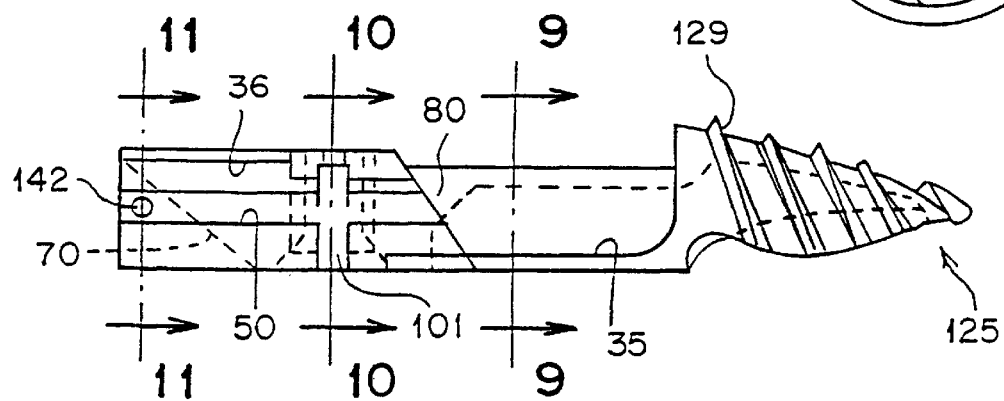
FIG. 8
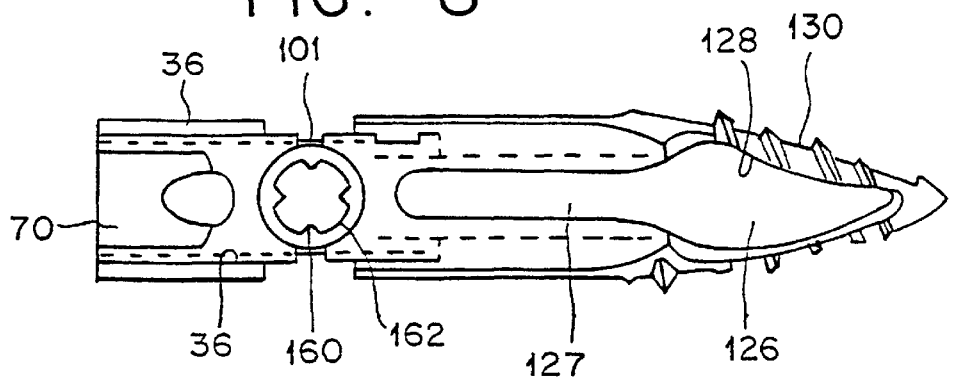

SCREW TIPPED ANCHOR ASSEMBLY

FIELD OF THE INVENTION

This invention relates to anchoring devices for fastening objects to hollow walls of plaster board, masonry, brick and the like wherein elongated fasteners, such as bolts, screws, etc. may be attached for further attachment of a work piece or fixture. More particularly, the invention relates to so-called toggle bolt anchors which penetrate wall board material and the like with a nut or anchor portion extending along a first axis, the anchor portion being moveable to a position extending along an axis normal to the first axis so that a threaded bolt may engage the threads of the nut to draw the nut against the back surface of the wall board

HISTORY OF THE INVENTION

In U.S. Pat. No. 5,221,169 (a copy of which is attached hereto and incorporated herein by reference) there is disclosed an anchor assembly for fasteners which comprises a pair of elongated wire-like legs supported in parallel relation with an anchor moveably supported on the legs and moveable from a first position substantially in alignment with the legs to a position transverse to the legs, and wherein the anchor defines tracks on each side to support the anchor on the legs. Pivotal movement of the anchor is achieved by the interaction between the tracks on the anchor and the legs upon which the anchor rides.

The problem with most anchors of the above type is that a hole has to be drilled in the wall before the anchor assembly can be inserted in the hole to dispose the anchor portion in the wall hollow to be drawn against the back surface of the wall. Drilling, especially in friable wall board material usually results in a damaged rear surface and thus a weakened wall. This results even in the instance where a drill tip is applied to a leading end of an anchor in such an anchor assembly.

In all instances in the prior art of which I am aware, in such anchors, assembling of and interaction between the parts is complex and/or cumbersome.

INVENTION

The present invention is an improvement over the anchor assembly disclosed in U.S. Pat. No. 5,221,169 and provides a screw tip on an end of the anchor member of the anchor assembly. The legs which are integral with and extend distally from a hollow cylindrical body with a proximal flanged end, are structured as posts, as opposed to wire-like legs, so as to stabilize the anchor as the screw tip of the anchor screws into the wall when the assembly is rotated with a tool, such as a screwdriver for which the aperture at the proximal flanged end of the cylindrical body is formed as a tool receptor as well a fastener receptor. The screw tip is also formed with a flute which extends from the tip of the screw tip proximally to a channel which extends a distance sufficient to dispose of the wall material that is cut into the flute while the threads of the screw tip are taping the wall material which becomes compressed between the relatively high turns of the screw thread but less than if the material access flute had not been provided. Thus a clean cut through the wall material without exploding the material on the back side of the wall is ensured.

THE DRAWINGS

FIG. 5 is a bottom plan view showing the flanged end of the collar and post portion of the assembly;

FIG. 6 is a front plan view of the screw tipped anchor portion of the anchor assembly of the invention;

FIG. 7 is a side plan view of the anchor portion of FIG. 6;

FIG. 8 is a rear plan view of the anchor portion of FIG. 6;

DESCRIPTION

Figure 1:
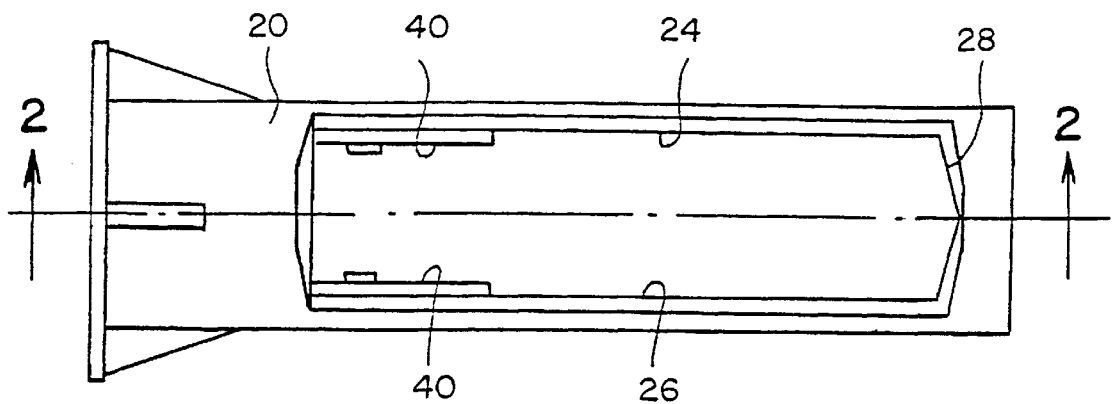
FIGS. 1 is a side elevational view of the collar and posts of the anchor assembly of the invention.

The anchor assembly 10 includes a collar 20 having an aperture 22 dimensioned and configured to receive the shank portion of a bolt 18, or the like. A pair of posts, 24, 26 extend integrally from the collar in parallel relation on either side of the post and collar portion of the assembly. The posts are connected to one another at their distal ends by a bent connecting end 28. The collar and aperture are configured to assure alignment between anchor member 31 and bolt fastener 18.

The anchor portion has forward and rearward tracks 35,36 disposed on opposite sides of the anchor portion which slideably engage the opposite sides of the posts as the anchor portion is initially moved forward by engagement of a forewardly moving bolt. The anchor portion is maintained in parallel relation with the posts by engagement of the ridges 40 and channels 50 on the posts and sides of the anchor portion respectively. When the anchor portion channels pass the end of the post ridges, the anchor is permitted to move from its position with its axis parallel with the posts to a position with its axis normal to the posts so that the bolt may be threaded in the threaded hole 60 of the anchor portion to draw the anchor portion against the back surface of the wall.

An internal ramp 70 is provided at the proximal end of the anchor portion to engage the end of the bolt resulting in the directing of the anchor portion out of parallel with the with the posts. External ramps 80 on either side of the anchor portion between the forward and rearward tracks 36,36, which slide on the edges of the posts, interact with the connection 28 between the posts to assure out of parallel relationship with the posts as well.

There is a space 100 between the forestward and rearmard tracks on either side of the anchor portion equal to the width of the posts to permit the 90 degree axes displacement of the anchor portion and collar and post portion. Channels 101 within these spaces receive the post ridges 40 when the anchor axis is normal to the axes of the posts.

The anchor portion and the collar and post portions are press fit in the assembly process. The assembly can be made of various materials, metal or plastic.

Figure 2:
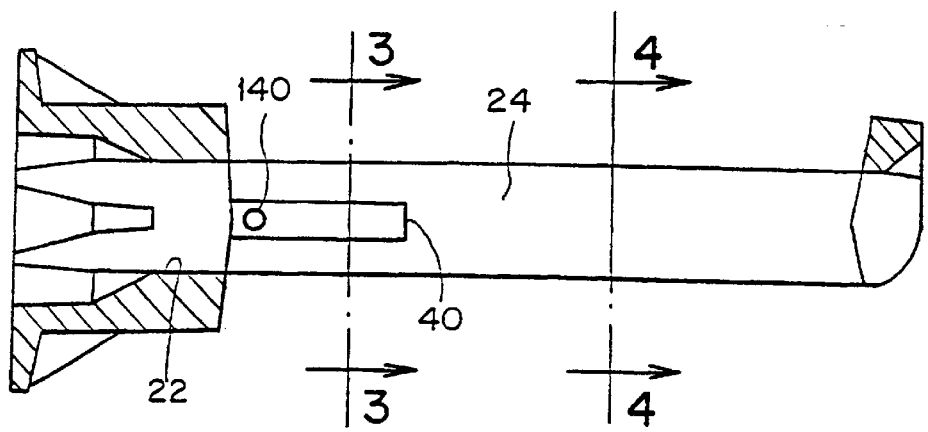
FIG. 2 is a section taken along the line A—A of FIG. 1.
Figure 3:
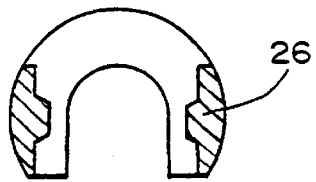
FIG. 3 is a section taken along the line C—C of FIG. 1.
Figure 4:
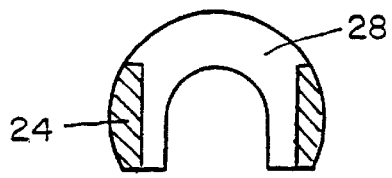
FIG. 4 is a section taken along the line B—B of FIG. 1.
Figure 9:
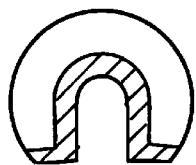
FIG. 9 is a section taken along the line A—A of FIG. 7.
Figure 10:
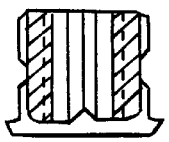
FIG. 10 is a section taken along the line B—B of FIG. 7.
Figure 14:
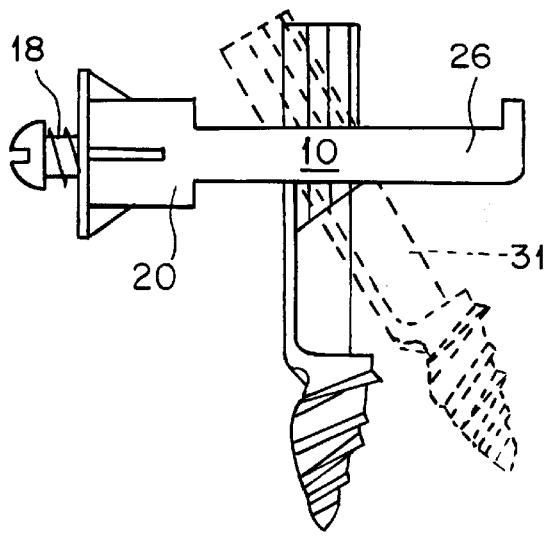
FIG. 14 is a side elevational view of the assembly of FIG. 13 in "action" showing the positions of the anchor portion as it is pivoted to its anchoring position.
Figure 12:
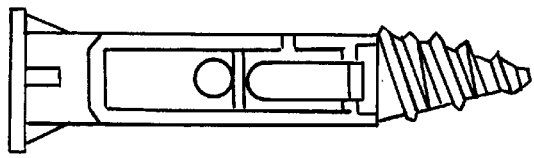
FIG. 12 is a section taken along the line C—C of FIG. 7.
Figure 11:
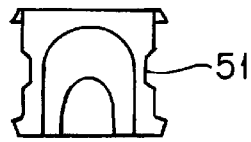
FIG. 11 is an end view of the anchor of FIG. 6.
Figure 13:
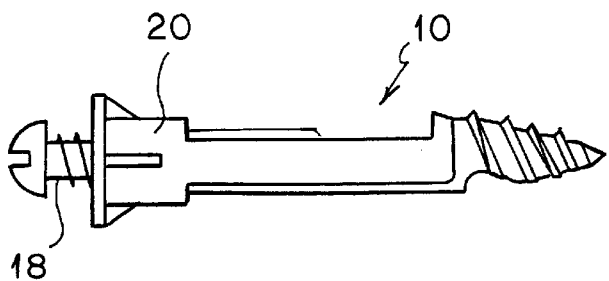
FIG. 13 is a side elevational view of the anchor of the invention in assembly and with a mock fastener head extending from the proximal end of the anchor assembly.

A significant part of the invention os the provision of a screw tip 125 on the distal end of the anchor portion together with a flute 126 with a cutting leading edge and which extends proximally to a channel 127. The leading edge 128 of the flute cuts the wall material which is deposited in the flute and given access to the channel thereby lessening the amount of wall board material which will be compressed between turns of the relatively high taping threads 129 of the screw tip and around the compression band 130 which runs between and parallel to the thread The leading edge is distended and curves back at its proximal edge. This shape together with the screw threads draws the anchor through the wall material rather than pushing the material foreward as occurs with a drilling action As in FIG. 2, protrusion 140 on ridge 40 of post 26 secures detent 142 (FIG. 7) on channel 50 of anchor member 31.

Bolt 18 may be a bolt, a machine screw, a self-tapping screw, or the like. In the presently preferred embodiment, bolt 18 is a self tapping type screw having a coarse thread tapering smaller at shaft end to a truncated conical shaft tip, which engages an unthreaded hole 60 (FIG. 8) having four tappable ridges 160 protruding therein. Spaces 162 between ridges 160 provide a place for ridge material displaced by the tapping to go.

Bolt 18 has a head which receives either Phillips or blade screwdrivers, as does the cross-slot 200 of collar 20.

I claim:

1. A wall anchor assembly comprising:
an assembly axis at the longitudinal center of the assembly
a collar;
a pair of posts extending from said collar;
the collar having means for passing a part of a bolt through said collar;
means for connecting the posts to each other, distal from the collar;
an anchor member, captive between said posts and between said collar and said connecting means;
said anchor member having:
an anchor axis at the longitudinal center of the anchor member, and
an anchor body portion;
a screwing configuration in which:
the anchor axis is substantially parallel to the assembly axis, and
the anchor body portion and posts form a partly cylindrical body portion without threads;
there is a chordal surface on a chord of the partly cylindrical body portion;
said anchor member further having:
means for screwing through the wall;
means for receiving the bolt perpendicular to the anchor axis and for engaging a bolt thread on said bolt;
means for rotating the anchor axis perpendicular to the posts and for locating said bolt in said receiving means, which receiving means further serves as a means for drawing the anchor member against the wall to clamp the wall anchor assembly to the wall;
a retaining means comprising:
a pair of parallel inner facing surfaces in the posts;
a pair of outer facing surfaces on the anchor member, said outer facing surfaces closely fitting within the inner facing surfaces;
a pair of outer non-facing surfaces on the anchor member;
at least one proximal track extending from one of the outer non-facing surfaces beyond an edge of the facing surfaces, said first track not fitting within the inner facing surfaces and thereby engaging an edge of the facing surfaces;
at least one distal track extending from an opposite of the outer non-facing surfaces beyond an edge of the facing surfaces, said second track not fitting within the inner facing surfaces and thereby engaging an other edge of the facing surfaces.

2. A wall anchor assembly according to claim 1 in which the engaging means comprises:
an elongated ridge on at least one of the inside facing surfaces; and
a complementary groove on the outside facing surface, for engaging the ridge.

3. A wall anchor assembly comprising:
an assembly axis at the longitudinal center of the assembly
a collar;
a pair of posts extending from said collar;
the collar having means for passing a part of a bolt through said collar;
means for connecting the posts to each other, distal from the collar;
an anchor member, captive between said posts and between said collar and said connecting means;
said anchor member having:
an anchor axis at the longitudinal center of the anchor member, and
an anchor body portion;
a screwing configuration in which:
the anchor axis is substantially parallel to the assembly axis, and
the anchor body portion and posts form a partly cylindrical body portion without threads;
there is a chordal surface on a chord of the partly cylindrical body portion;
said anchor member further having:
means for screwing through the wall;
means for receiving the bolt perpendicular to the anchor axis and for engaging a bolt thread on said bolt;
means for rotating the anchor axis perpendicular to the posts and for locating said bolt in said receiving means, which receiving means further serves as a means for drawing the anchor member against the wall to clamp the wall anchor assembly to the wall;
in which the rotating means comprises a connecting means engaging ramp surface facing the distal end between the proximal and distal ends of the anchor member for translating a longitudinal bolt induced force into a rotational force against the anchor member.

4. A wall anchor assembly according to claim 3 in which the collar comprises means for receiving externally applied rotational energy.

5. A wall anchor assembly according to claim 4 in which the means for receiving externally applied rotational energy is a screw head.

6. A wall anchor assembly according to claim 4 in which the screw head is a Phillips type head.

7. A wall anchor assembly comprising:
an assembly axis at the longitudinal center of the assembly
a collar;
a pair of posts extending from said collar;

the collar having means for passing a part of a bolt through said collar;

means for connecting the posts to each other, distal from the collar;

an anchor member, captive between said posts and between said collar and said connecting means;

said anchor member having:
an anchor axis at the longitudinal center of the anchor member, and
an anchor body portion;

a screwing configuration in which:
the anchor axis is substantially parallel to the assembly axis, and
the anchor body portion and posts form a partly cylindrical body portion without threads;
there is a chordal surface on a chord of the partly cylindrical body portion;

means in the screwing configuration:
for engaging the anchor member with the anchor axis substantially parallel to the assembly axis, and
for transmitting axial rotation from the collar to the anchor member;

said anchor member further having:
means for screwing through the wall;
means for receiving the bolt perpendicular to the anchor axis and for engaging a bolt thread on said bolt;
means for rotating the anchor axis perpendicular to the posts and for locating said bolt in said receiving means, which receiving means further serves as a means for drawing the anchor member against the wall to clamp the wall anchor assembly to the wall;

in which the posts, said collar and said connecting means, by holding the anchor member captive, further serve as means for retaining the anchor member after disengagement from the bolt and for repeatably relocating said bolt in said receiving means;

the retaining means further comprise:
a pair of parallel inner facing surfaces in the posts;
a pair of outer facing surfaces on the anchor member, said outer facing surfaces closely fitting within the inner facing surfaces;
a pair of outer non-facing surfaces on the anchor member;
at least one proximal track emending from one of the outer non-facing surfaces, said track not fitting within the inner facing surfaces and thereby engaging an edge of the facing surfaces;
at least one distal track extending from an opposite of the outer non-facing surfaces beyond an edge of the facing surfaces, said second track not fitting within the inner facing surfaces and thereby engaging an other edge of the facing surfaces;

further comprising means for releasably securing the anchor member slidably engaged with its longitudinal axis substantially parallel to the posts;

in which the screwing means comprises:
a flute;
said flute having a cutting leading edge for cutting a wall material, in which the cutting leading edge is distended and curves back at its proximal edge;
said flute extending to a channel means for receiving the wall material cut;
a thread upon the tip;
a compression band between the thread;

in which the collar comprises flange means for limiting penetration of the collar to substantially flush with an outer surface of the wall;

fin means for limiting axial rotation of the collar after the collar has penetrated the wall;

in which the passing means further serves as means:
for directing the bolt to a proximal end of the anchor member when the anchor member is slidably engaged; and
for directing the bolt to the receiving means when the anchor member is perpendicular to the posts;

in which the engaging means comprises:
a pair of elongated ridges on the pair of parallel inner facing surfaces; and
a pair of complementary grooves, for engaging the pair of elongated ridges, on the pair of outer facing surfaces;

in which the anchor axis rotating means comprises:
a bolt engaging ramp at the proximal end of the anchor member for translating a longitudinal bolt induced force into a rotational force against the anchor member; and
a connecting means engaging ramp surface facing the distal end between the proximal and distal ends of the anchor member, for translating a longitudinal bolt induced force into a rotational force against the anchor member;

in which the collar comprises means for receiving externally applied rotational energy.

8. A wall anchor assembly according to claim 7 further including means for securing the anchor member slidably engaged, prior to the anchor assembly's first use.

9. A wall anchor assembly according to claim 8 in which the securing means includes a protrusion and a cooperating detent.

10. A method of anchoring a bolt to a wall, said method comprising the steps of:

applying a pointed tip of an anchor member of an anchor assembly to the wall, engaging a screwdriver to a screw head of the anchor assembly;

pressing and screw head with the screwdriver to locate and depress the pointed tip; rotating the screw head with the screwdriver:
to transmit rotation from a collar to a pair of posts to the anchor member, slidably engaged to the pair of posts;
to immediately engage a screwing thread on the tip;
to cut material of the wall with a cutting leading edge of a flute;
to compress outer material of the wall with a compression band;
to swallow the cut material into the flute and thereafter into an adjacent channel, and thereafter to a chordal surface, thereby reducing compressing of the outer material, to thereby pull the tip through the wall;

terminating rotation after the tip and threads have penetrated the wall;

pressing the anchor assembly into the wall without further rotation to engage anti-rotation fins on a collar to the wall, until a flange resists further inward motion;

inserting a bolt into the collar, which collar directs the bolt toward a proximal end of an anchor member;

pressing the bolt against a ramp on a proximal end of the anchor member;

by said pressing, releasing the anchor member from a securing detent and sliding the anchor member distally to disengage a ridge from a groove;

after disengaging, pressing a ramp surface facing the distal end, said ramp surface located on the anchor member between the distal and proximal ends of the anchor member, against a protrusion on the posts, which ramp surface pressing, together with the pressing against the proximal ramp, rotates the anchor member to perpendicular to the posts;

said collar locating the bolt against a receiving means on the anchor member;

rotating the bolt to engage the receiving means and to pull the chordal surface of the anchor member against the wall, thereby clamping the anchor assembly to the wall.

11. A wall anchor assembly comprising:

an assembly axis at the longitudinal center of the assembly a collar;

said collar having a flange, said flange having a longitudinal radial fin means for restricting rotation around the assembly axis;

a pair of posts extending from said collar;

the collar having means for passing a part of a bolt through said collar;

means for connecting the posts to each other, distal from the collar;

an anchor member, captive between said posts, and between said collar and said connecting means;

said anchor member having:
  an anchor axis at the longitudinal center of the anchor member, and
  an anchor body portion;

a screwing configuration in which:
  the anchor axis is substantially parallel to the assembly axis, and
  the anchor body portion and posts form a partly cylindrical body portion without threads,
  there is a chordal surface on a chord of the partly cylindrical body portion;

means in the screwing configuration:
  for slidably engaging the anchor member with the anchor axis substantially parallel to the assembly axis, said engaging means comprising:
    a pair of substantially flat surfaces inside the posts,
    at least one elongated ridge on at least one of the inside surfaces;
    a pair of substantially flat surfaces outside the anchor member, closely fitting within the inside substantially flat surfaces;
    at least one complementary groove on at least one of the outside facing surfaces for engaging the ridge:
      for transmitting axial rotation from the collar to the anchor member, and
      for maintaining the anchor axis parallel to the assembly axis;

the ridge and the groove further serving as means:
  for sliding the anchor member longitudinally; and
  for disengaging to permit rotation of the anchor axis perpendicular to the assembly axis;

said anchor member further having:
  a channel on the chordal surface;
  means for screwing through a wall said screwing means comprising:
    a dome having:
      a base,
      a pointed centering tip at the anchor axis,
      an outer surface there-between, tapering from the base to the pointed centering tip;
      a single outwardly facing flute defined by outer edges and extending proximally along one side of said outer surface radially of said anchor axis from said pointed tip to and communicating with and forming an extension of said channel, said flute being partially closed at said pointed centering tip along the side of said outer surface radially of said anchor axis opposite said one side because of a diminishing diameter along said outer surface;
      said outer edges of said flute comprising a leading cutting edge and a trailing edge;
      said leading cutting edge extending radially outward to said base from said pointed tip and diverging from said trailing edge to provide access to said flute and channel for receiving material cut from the wall by said leading cutting edge;
      an outer thread extending from at the pointed tip and terminating at the base;
      said flute and said outer thread being positioned relative to one another so as to serve as screw means for drawing the anchor through the wall structure;

said collar, passing means, and bolt further serving as means for disengaging the engaging means and for rotating the anchor axis, anchor member, and screwing means perpendicular to the assembly axis, to form the assembly into an anchoring configuration;

said anchor member further comprising:
  forward and rearward tracks, extending from the outside substantially flat surfaces, and serving as means for cooperating with edges of the posts to guide the anchor member sliding along the assembly axis;
  means for receiving the bolt perpendicular to the anchor axis and for engaging a bolt thread on said bolt;
  means for rotating the anchor axis perpendicular to the posts, comprising:
    an end ramp at a longitudinal end of the anchor member, and
    a side ramp having a surface facing the distal end, said side ramp at the outside substantially flat surfaces, and spaced from the tip and from the end ramp, for cooperating with the connecting means;
  said forward and rearward tracks further serving as means for:
    after rotation of the anchor axis, stopping the anchor member perpendicular to the assembly axis, and
    locating the receiving means to reliably receive the bolt;

said receiving means further serving as a means for drawing the anchor member against the wall to clamp the wall anchor assembly to the wall.

12. A wall anchor assembly comprising:

an assembly axis at the longitudinal center of the assembly a collar;

a pair of posts extending from said collar, having a uniform space between said posts;

each post of the pair has an inside surface;

the collar having an opening for passing a part of a bolt through said collar;

a connector for connecting the posts to each other, distal from the collar;

an anchor member between said posts, a proximate track on a first edge of the anchor member extending the first edge outside the uniform space to engage a first post edge of a first post of the pair of posts;

a distal track on a second edge of the anchor member extending the second edge outside the uniform space to engage a second post edge;

said proximate and distal tracks thereby retaining said anchor member captive between said pair of posts;

said anchor member having a longitudinal anchor axis;

a penetrating configuration in which the longitudinal anchor axis is substantially parallel to the assembly axis, a tongue protrudes from one of said inside surfaces;

a groove on the anchor member for engaging said tongue in the penetrating configuration, said anchor member further having:
- a tip for penetrating the wall;
- an intermediate distal ramped surface for rotating the longitudinal anchor axis perpendicular to the assembly axis;
- a hole for receiving the bolt perpendicular to the longitudinal anchor axis,
- said hole having an interior surface for engaging a bolt thread on said bolt, which interior surface cooperates with said bolt thread to draw the anchor member against the wall to clamp the anchor assembly to the wall.

13. A wall anchor assembly according to claim 12 in which there is a second proximate track on a third edge of the anchor member, said third edge opposite said first edge for balancing proximate retaining forces.

14. A wall anchor assembly according to claim 12 in which there is a second distal track on a fourth edge of the anchor member, said fourth edge opposite said second edge for balancing distal retaining forces.

15. A wall anchor assembly according to claim 12 which a second tongue engages a second groove to balance engaging forces on opposite sides of the anchor member in the penetrating configuration.

16. A wall anchor assembly according to claim 12 in which the posts, said collar and said connector, by holding the anchor member captive, further serve to retain the anchor member after disengagement from the bolt and for repeatably relocating said bolt in said hole.

17. A wall anchor assembly, according to claim 12, further comprising:
- a second proximate track on a third edge of the anchor member, said third edge opposite said first edge for balancing proximate retaining forces;
- a second distal track on a fourth edge of the anchor member, said fourth edge opposite said second edge for balancing distal retaining forces;
- a second tongue engages a second groove to balance engaging forces on opposite sides of the anchor member in the penetrating configuration.

18. A wall anchor assembly, according to claim 17, in which the posts, said collar and said connector, by holding the anchor member captive, further serve to retain the anchor member after disengagement from the bolt and for repeatably relocating said bolt in said hole.

19. A method of anchoring a bolt to a wall, said method comprising the steps of:
- applying a penetrating tip of an anchor member of an anchor assembly to the wall, engaging a screwdriver to a screw head of the anchor assembly;
- pressing and screw head with the screwdriver to locate and depress the penetrating tip; rotating the screw head with the screwdriver to transmit rotation from a collar to a pair of posts to the anchor member, slidably engaged to the pair of posts; to rotate a penetrating tip;
- pressing the bolt against a ramp on a proximal end of the anchor member;
- by said pressing, releasing the anchor member from a securing detent and sliding the anchor member distally to disengage a ridge from a groove;
- after disengaging, pressing a ramp surface facing the distal end, said ramp surface located on the anchor member between the distal and proximal ends of the anchor member, against a protrusion on the posts, which ramp surface pressing, together with the pressing against the proximal ramp, rotates the anchor member to perpendicular to the posts;
- said collar locating the bolt against a hole on the anchor member;
- rotating the bolt to engage an interior surface of the hole and to pull a chordal surface of the anchor member against the wall, thereby clamping the anchor assembly to the wall.

* * * * *